(12) United States Patent
Bloswick et al.

(10) Patent No.: US 8,087,684 B2
(45) Date of Patent: Jan. 3, 2012

(54) WHEELCHAIR ADVANTAGE MOBILITY SYSTEM

(75) Inventors: Donald S. Bloswick, Salt Lake City, UT (US); Jeffrey R. Clark, Brigham City, UT (US); Miguel Gallegos, Salt Lake City, UT (US); Brian J. Horne, Woods Cross, UT (US); Abraham M. Kearl, Syracuse, UT (US); Ryosuke Osawa, Yokohamashi (JP)

(73) Assignee: University of Utah Research Foundation, Salt Lake City, UT (US)

( * ) Notice: Subject to any disclaimer, the term of this patent is extended or adjusted under 35 U.S.C. 154(b) by 440 days.

(21) Appl. No.: 11/919,467

(22) PCT Filed: Apr. 26, 2006

(86) PCT No.: PCT/US2006/316068
§ 371 (c)(1),
(2), (4) Date: Jun. 17, 2009

(87) PCT Pub. No.: WO2006/116623
PCT Pub. Date: Nov. 2, 2006

(65) Prior Publication Data
US 2009/0295119 A1    Dec. 3, 2009

Related U.S. Application Data

(60) Provisional application No. 60/675,302, filed on Apr. 26, 2005, provisional application No. 60/685,736, filed on May 27, 2005.

(51) Int. Cl.
*B62M 1/14* (2006.01)

(52) U.S. Cl. .................. 280/250.1; 280/304.1

(58) Field of Classification Search ............... 280/250.1, 280/304.1, 246, 247, 248, 251, 296, 242.1
See application file for complete search history.

(56) References Cited

U.S. PATENT DOCUMENTS

| | | | | |
|---|---|---|---|---|
| 1,058,123 | A * | 4/1913 | Whitaker | 280/237 |
| 4,811,964 | A * | 3/1989 | Horn | 280/250.1 |
| 4,840,076 | A * | 6/1989 | Brubaker et al. | 74/143 |
| 5,632,499 | A * | 5/1997 | Hutcherson et al. | 280/246 |
| 5,865,455 | A * | 2/1999 | Taylor | 280/250.1 |
| 6,234,504 | B1 * | 5/2001 | Taylor | 280/250.1 |
| 6,371,502 | B1 * | 4/2002 | Howlett et al. | 280/304.1 |
| 6,715,780 | B2 * | 4/2004 | Schaeffer et al. | 280/248 |
| 6,916,032 | B2 * | 7/2005 | Wong | 280/244 |

(Continued)

*Primary Examiner* — Paul N Dickson
*Assistant Examiner* — Tashiana Adams
(74) *Attorney, Agent, or Firm* — Thorpe North & Western LLP

(57) ABSTRACT

A wheelchair propulsion and braking system (10) includes at least one clutch engagement disk rotatably couplable to a wheelchair frame (14). The clutch engagement disk (32) includes a gear (38) that is rotatable with the clutch engagement disk (32), and a drive chain (40) disposed around the gear (38). A drive wheel (50) is rotatably attachable to a wheel (22) of the wheelchair (12), and operatively attachable to the drive chain (40). The system also includes at least one lever arm (60) that is rotatably couplable to the wheelchair frame (14). The at least one lever arm (60) includes a handle (62) operatively coupled to an upper end (64) of the lever arm (60). The handle (62) is oriented in an accessible position during use. A pair of calipers (70) is operatively coupled to each lever arm (60), and engageable with the at least one clutch engagement disk (32). An actuator (80) is operatively coupled to the handle (62) to actuate the calipers (70), and to engage the clutch engagement disk (32).

18 Claims, 6 Drawing Sheets

U.S. PATENT DOCUMENTS

| | | | |
|---|---|---|---|
| 7,108,321 B2 * | 9/2006 | Davis | 297/252 |
| 7,344,146 B2 * | 3/2008 | Taylor | 280/246 |
| 2003/0071435 A1 * | 4/2003 | Schaeffer et al. | 280/248 |
| 2005/0067807 A1 * | 3/2005 | Harcourt et al. | 280/246 |
| 2007/0052196 A1 * | 3/2007 | Taylor | 280/250.1 |

* cited by examiner

WHEELCHAIR ADVANTAGE MOBILITY SYSTEM

FIELD OF THE INVENTION

The present invention relates generally to wheelchairs, and more particularly to manual propulsion devices and methods for allowing a wheelchair occupants to move their wheelchairs.

BACKGROUND OF THE INVENTION

Wheelchairs provide a means of transportation and mobility to hundreds of thousands of people worldwide. The designs of these basic devices have evolved over the years to be more comfortable, reliable, and user friendly. However, the propulsion and braking systems for manual wheelchairs remains problematic for many wheelchair users.

Generally, propelling a typical wheelchair requires the wheelchair user to create friction on the hand ring of the wheel by pressing against it while also applying a tangential force to rotate the wheel. Many factors affect the efficiency of this propulsion system. For example, the force required to push a wheelchair varies due to changes in the terrain or incline. When ascending inclined terrain many wheelchair users experience difficulty providing the strength and endurance necessary to climb long or steep inclines. Similarly, when descending an inclined surface, users often find it difficult to control the speed of the wheelchair with the braking systems of typical wheelchairs. Thus, current wheelchair designs are not ideal for diverse surfaces and inclines.

Similarly, users of typical wheelchairs can brake or slow the wheelchair by applying friction between their hands and the hand rings on the wheels. This method of braking can wear the skin of the arms and hands of the user, thereby causing discomfort to the user. Additionally, slowing a chair in this manner can also damage the joints in the hands and wrists over time. Thus, friction provided by users' hands against the wheel while often the most common means of braking, can sometimes be dangerous and is not ideal.

Typical wheelchairs have existing wheel lock devices. However, these devices do not work well as a brake to slow the wheelchair while in motion. These locks are only meant to keep the wheelchair stationary, and often do not perform this function in many circumstances. An improved wheelchair brake is in high demand and continues to be sought.

Another problem of common manually powered wheelchairs is that the posture of a wheelchair user while pushing on hand rings can cause deviations in the angles of the user's wrists. These deviations can create high forces and stresses in the user's tendons that can result in injuries. Additionally, these stresses and forces on the user's wrists affect the ability of the user to grip and move the hand ring. Thus, some users have the strength to travel across most terrains and inclines while others may find it difficult to go up ramps that are specifically provided for wheelchairs.

Attempts to solve these problems have been unable to develop a design that successfully applies to a mainstream wheelchair. A few existing designs use levers to propel the wheelchair in place of the hand ring. Gearing devices have also been implemented on some of these alternative wheelchair designs to alter the user's mechanical advantage. Unfortunately, these designs often sacrifice other advantages of current wheelchairs such as comfort, maneuverability, easily removable wheels, or minimal chair width and weight.

Many wheelchair users desire a device that will make propelling their wheelchair easier and less damaging to their body. An improved wheelchair brake is also in high demand and continues to be sought.

SUMMARY

Accordingly, the present invention provides a wheelchair propulsion and braking system including at least one clutch engagement disk rotatably couplable to a wheelchair frame. The clutch engagement disk includes a gear that is rotatable with the clutch engagement disk, and a drive chain disposed around the gear. A drive wheel can be rotatably attachable to a wheel of the wheelchair, and operatively attachable to the drive chain. The system also includes at least one lever arm that is rotatably couplable to the wheelchair frame. The at least one lever arm can include a handle operatively coupled to an upper end of the lever arm. The handle can be oriented in an accessible position during use. A pair of calipers can be operatively coupled to each lever arm, and engageable with the at least one clutch engagement disk. An actuator can be operatively coupled to the handle to actuate the calipers, and to engage the clutch engagement disk.

In one detailed aspect, the clutch engagement disk can be a disk brake.

In another detailed aspect of the invention, the wheelchair propulsion and braking system can include a pair of lever arms, a pair of clutch engagement disks, and a pair of drive wheels.

The present invention also provides for a wheelchair including a lever propulsion system operatively connected to a drive train system. The drive train system can be connected to at least one set of wheels mounted on a wheelchair frame. A disk brake system can be operatively connected to the lever propulsion system and the drive train system such that actuation of the disk brake system is provided by the lever propulsion system to rotate the at least one set of wheels.

The present invention also provides for a retrofit kit for modifying a wheelchair. The kit can include a lever propulsion system including a pair of lever arms. Each lever arm can have an actuator operatively connected to the lever arm. The kit can also include a drive train system having a pair of drive chains and a pair of drive wheels. The kit can also include a disk brake system having a pair of disk brakes.

There has thus been outlined, rather broadly, the more important features of the invention so that the detailed description thereof that follows may be better understood, and so that the present contribution to the art may be better appreciated. Other features of the present invention will become clearer from the following detailed description of the invention, taken with the accompanying drawings and claims, or may be learned by the practice of the invention.

BRIEF DESCRIPTION OF THE DRAWINGS

Additional features and advantages of the invention will be apparent from the detailed description which follows, taken in conjunction with the accompanying drawings, which together illustrate, by way of example, features of the invention; and, wherein.

Figure 1:
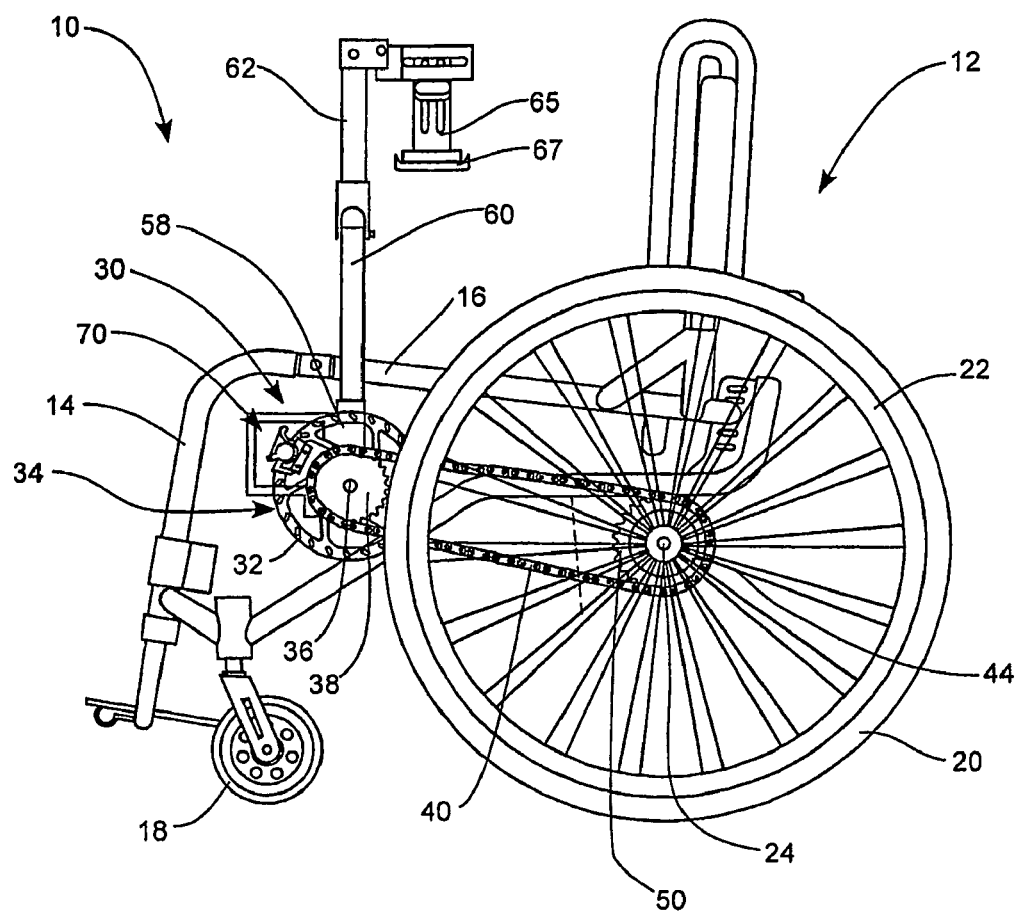
FIG. 1 is a side view of a wheelchair propulsion and braking system in accordance with an embodiment of the present invention, shown attached to a wheelchair.

Reference will now be made to the exemplary embodiments illustrated, and specific language will be used herein to describe the same. It will nevertheless be understood that no limitation of the scope of the invention is thereby intended.

DETAILED DESCRIPTION OF EXAMPLE EMBODIMENT(S)

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting.

It must be noted that, as used in this specification and the appended claims, the singular forms "a," "an," and "the" include plural referents unless the context clearly dictates otherwise. Thus, for example, reference to "a drive mechanism" includes one or more of such mechanisms, reference to "a track" includes reference to one or more of such elements, and reference to "engaging" includes reference to one or more of such steps.

Definitions

In describing and claiming the present invention, the following terminology will be used in accordance with the definitions set forth below.

As used herein, "disk brake" refers to a disk that has a frictionally engageable surface. Disk brakes can be used to slow a moving wheelchair by slidably engaging the frictionally engageable surface, or they can be used to propel a wheelchair by turning the disk.

As used herein, "drive chain" refers to a flexible, continuous-loop power transfer device. A drive chain can be a chain with interlocking links, a continuous belt, or other similar loop.

As used herein, "gear" refers to a rotatable mechanism that can transfer rotational power to a drive chain, as defined above, in order to maximize mechanical advantage, relative speed, and direction of travel. Non-limiting examples of suitable gears can include a toothed wheel or a pulley.

As used herein, "wheelchair" refers to a chair with wheels that can be propelled by the occupant. A wheelchair can be a manual chair, propelled by user's own power, or a power chair, propelled by an electrical, chemical, or a mechanical power supply and motor. Additionally, a wheelchair can include three wheel or four wheel chairs.

As used herein, "metallic" refers to a metal, or an alloy of two or more metals. A wide variety of metallic materials is known to those skilled in the art, such as aluminum, copper, chromium, iron, steel, stainless steel, titanium, tungsten, zinc, zirconium, molybdenum, etc., including alloys and compounds thereof. Of particular interest are lightweight metals and metal alloys such as aluminum, titanium, and alloys thereof.

As used herein, with respect to an identified property or circumstance, "substantially" refers to a degree of deviation that is sufficiently small so as to not measurably detract from the identified property or circumstance. The exact degree of deviation allowable may in some cases depend on the specific context.

As used herein, "substantially free of" or the like refers to the lack of an identified element or feature. Particularly, elements that are identified as being "substantially free of" are either completely absent or are included only as a minor component which is insubstantial enough so as to have no measurable effect on the invention.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited.

As used herein, a plurality of items, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. It is not the purpose of this specification to exhaustively outline every possible distinction among potentially useful components, but rather to illustrate the principles of the present invention, often with the use of such lists.

Invention

The present invention generally provides for a wheelchair manual propulsion and braking system. The system includes a lever disposed on each side of the wheelchair that is accessible by a user sitting in the wheelchair. The levers can be pulled or pushed by the user to propel the wheelchair in a forward or reverse direction. The levers also can be pulled or pushed to decelerate, or brake the wheelchair. Each lever has an actuator that is operatively coupled to a pair of calipers. The calipers are actuated to close about and grasp a disk rotatably coupled to the wheelchair frame. A drive chain or belt can be operatively coupled between the disk and the rear wheels of the wheelchair so that as the calipers rotate the disk, the disk rotates the chain which turns the rear wheels of the wheelchair. Further, the wheelchair propulsion and braking system of the present invention is substantially that disclosed in the U.S. Provisional Patent Application No. 60/675,302, filed Apr. 26, 2005, and the U.S. Provisional Patent Application No. 60/685,736, filed May 27, 2005, which are each incorporated herein by reference in their entirety for all purposes.

Additionally, the wheelchair propulsion and braking system of the present invention is designed to allow a wheelchair user to move a lever arm to propel, stop and turn the wheelchair. A disk brake can be operatively coupled to the lever and can act like the clutch of a car in that when the disk brake is engaged the car's speed can be changed, and when the disk brake is not engaged the car will only coast. When the disk brake is engaged the force from the levers is transferred through a chain and sprocket drive-train to a wheel of the wheelchair, causing the wheel to rotate. In this way, the chair can be propelled when the user actuates the brake and pushes on the levers. Motion can occur in the same direction as the force applied to the levers. Thus, whether the user moves forward or backward depends on which direction the handle is moved when the clutch is actuated. The same setup can be used to decelerate and stop the chair except the brake will not be fully engaged. The braking action of the present invention can act as a slipping clutch or a standard brake.

In use, the present invention generally allows a wheelchair user sitting in the wheelchair can grasp the levers, actuate the calipers to engage the disk, and push or pull the levers to rotate the disk. The rotating disk can rotate the chain, which rotates the rear wheels of the wheelchair, and propels the chair. The user can then disengage the calipers and pull or push the levers in order to repeat the propulsion cycle. Similarly, a wheelchair user can slow a moving wheelchair by grasping the levers, and actuating the calipers to engage the rotating disks, which tends to pull the handles forward. The wheelchair user can resist the forward pull of the levers to provide resistance to the rotating disk, thereby slowing the disk or even stopping the rotation of the disk. A wheelchair user can also turn a wheelchair by grasping the levers and actuating each caliper selectively and independently.

As illustrated in FIG. 1, a wheelchair propulsion and braking system, indicated generally at 10, in accordance with an embodiment of the present invention is shown attached to a wheelchair, shown generally at 12, for use in propelling and slowing the wheelchair. The wheelchair can have a frame 14 with a seat 16. The wheelchair can also have front wheels 18 and rear wheels 20. The rear wheels can have a wheel ring 22 that can be grasped by an occupant of the seat and turned by an occupant of the seat in order to propel the wheelchair.

The wheelchair propulsion and braking system 10 can include a clutch, shown generally at 30. The clutch 30 can include at least one clutch engagement disk 32 disposed below the seat 16 of the wheelchair frame 14. The clutch engagement disk 30 can have a frictionally engageable surface 34. The frictionally engageable surface 34 can be engaged to rotate the engagement disk 32. In one aspect, the clutch engagement disk 32 can be a disk brake. The engagement disk 32 can be rotatably attached to an axle 36. The clutch axle 36 can be attached to the wheelchair frame 14.

A gear 38 can be coupled to the engagement disk 32. The gear 38 can be concentric with the engagement disk 32 so that both the engagement disk and the gear 38 can rotate together on the axle 36. In one aspect, the gear 38 can be a toothed gear, such as sprocket. In another aspect, the gear 38 can be a smooth gear such as a pulley. A drive chain or belt 40 can be disposed around the gear 38 and can be rotatable by the gear 38.

Figure 2:
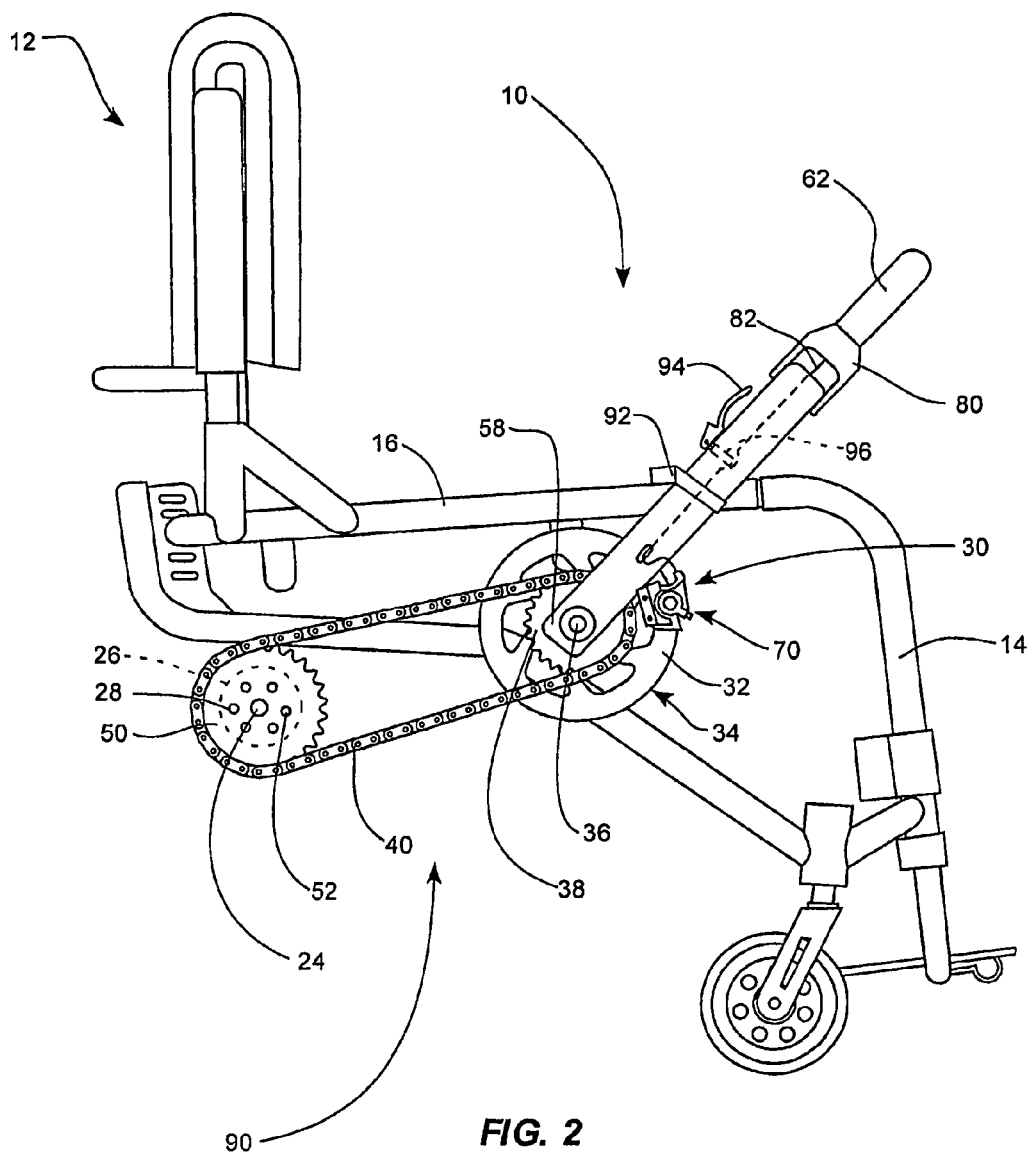
FIG. 2 is a side view of the wheelchair propulsion and braking system in accordance with another embodiment of the present invention shown attached to a wheelchair having the rear wheels removed.

Referring to FIG. 2, the wheelchair propulsion and braking system 10 can also include a drive wheel 50. The drive wheel 50 can be rotatably attached to a wheel (not shown) of the wheelchair 12. In one aspect, the drive wheel 50 can be a toothed wheel or gear, such as a sprocket, and can be attached to a rear wheel 20 of the wheelchair 12, as shown in FIG. 1. The drive wheel 50 can be concentric with the axle 24 of the rear wheel 20 and can be coupled to the rear wheel 20 to rotate with the rear wheel. In this way, as the rear wheel 20 can be rotated by forces applied to the drive wheel 50. The drive chain 40 can be disposed around and operatively attached to the drive wheel 50.

Referring again to FIG. 2, the drive wheel 50 can be rigidly mounted to the rear wheel by way of a wheel hub, shown by dashed lines at 26. The drive wheel 50 can have pins 52 that can couple the rotation of the drive wheel 50 to the wheel hub 26 of the rear wheel through corresponding holes 28 in the wheel hub. The forward gear 38, drive chain 40 and drive wheel 50 can form a drive train, indicated generally at 90. With this setup, anytime the rear wheels 20 of the wheelchair 12 are rotating, the drive wheel 50, drive chain 40, and clutch engagement disk 32 are also rotating.

Thus, in use, the clutch engagement disk 32 can be rotated by engaging the engagement surface 34. When the clutch engagement disk 32 is rotated, the gear 38 can also rotate and can engage and rotate the drive chain 40. As the drive chain 40 rotates, the drive chain 40 can engage and rotate the drive wheel 50. As the drive wheel 50 rotates, the rear wheel 20 of the wheelchair 12 can also rotate and propel the wheelchair 12.

Figure 3:
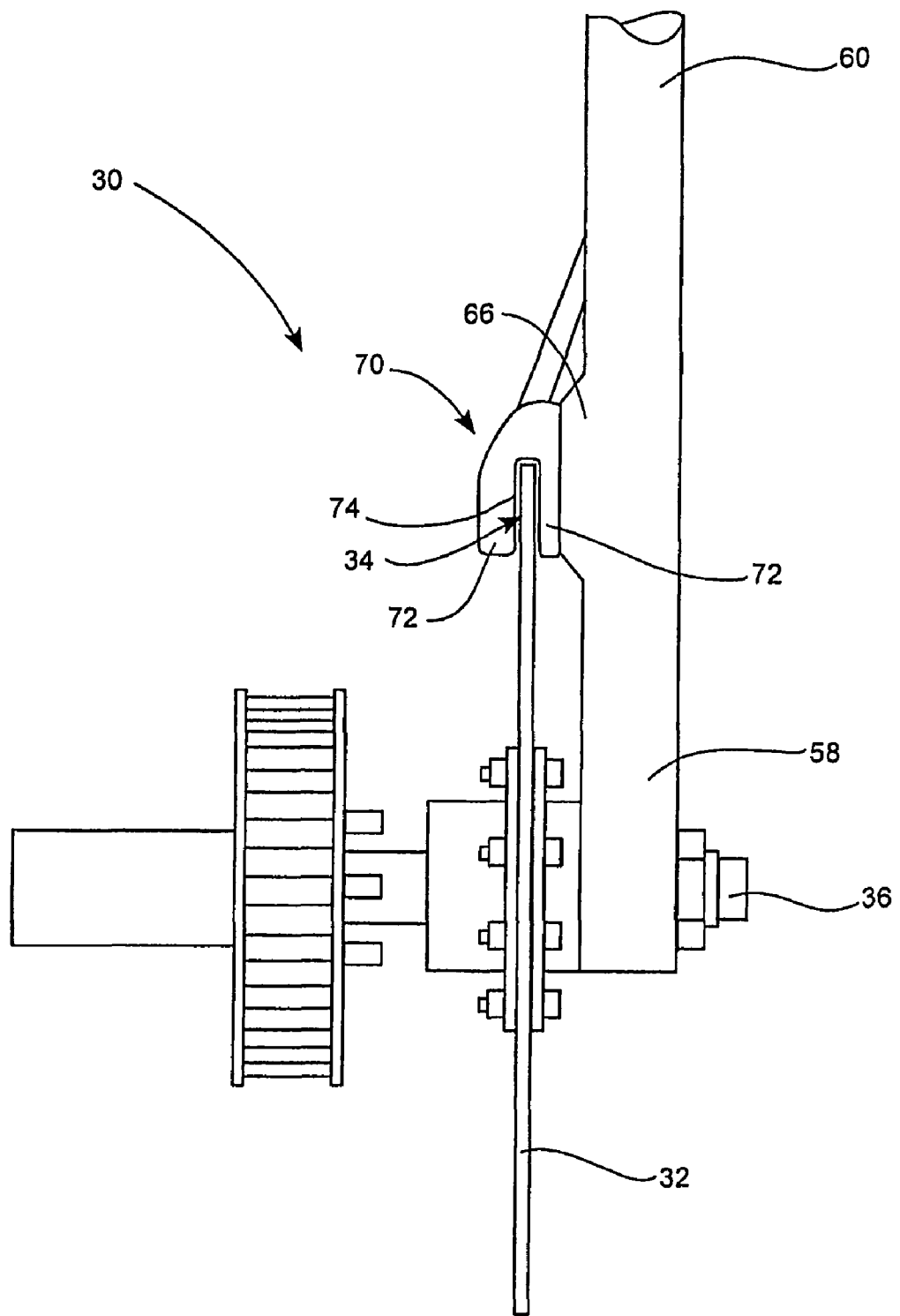
FIG. 3 is a front view of a disk brake of the wheelchair propulsion and braking system of FIG. 1.
Figure 4:
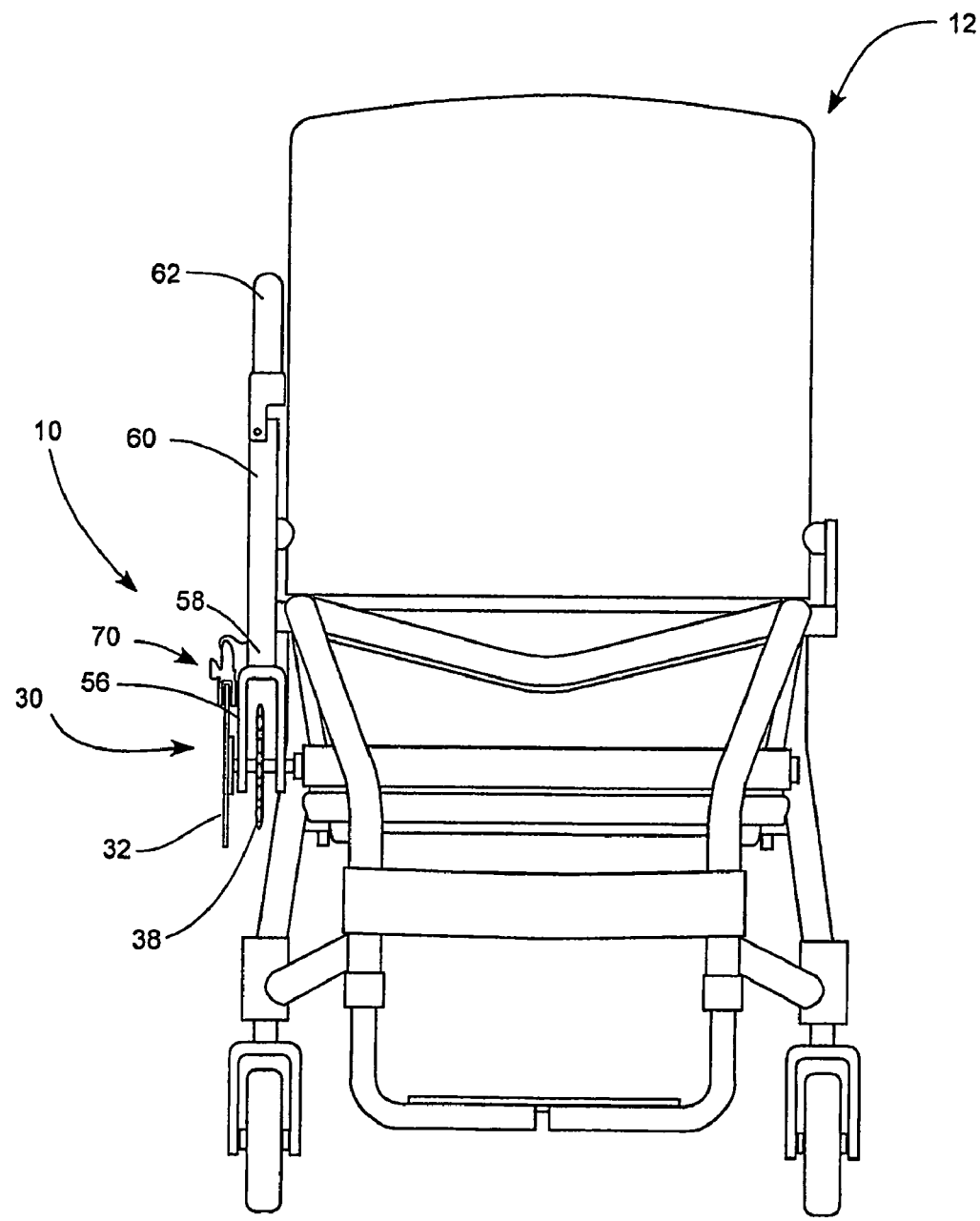
FIG. 4 is a front view of the wheelchair propulsion and braking system of FIG. 2, shown attached to a wheelchair.

As shown in FIGS. 1 and 2, the wheelchair propulsion and brake device 10 can also include at least one lever arm 60. The lower end 58 of the lever arm 60 can be rotatably coupled to the clutch axle 36 and can rotate about the clutch axle 36 independent of the rotation of the clutch axle. For example, in one aspect, the lower end 58 of the lever arm can include a solid shaft rotatably coupled to the clutch axle 36, as shown in FIG. 3. In another aspect, the lower end 58 of the lever arm 60 can have be forked with the fork 56 sized and shaped to fit over the gear 38 without contacting the gear, as shown in FIG. 4.

Advantageously, the at least one lever arm 60 changes the mechanism of force transfer from user to wheelchair from a system of friction between the user's hands and the hand rings, to a lever and mechanical clutch system that reduces stress in the user's skin or joints. Thus, the lever arm design of the present invention reduces biomechanically-stressful propulsion of manual wheelchairs without the devices of the present invention.

Also shown in FIG. 3, the lever aim 60 can also include a pair of calipers, indicated generally at 70. The pair of calipers 70 can be operatively coupled to a lower portion 66 of the lever arm 60. The pair of calipers 70 can be moved by the lever arm 60 in a forward and rearward direction in relation to the wheelchair 12, as the lever arm 60 is rotated or pivoted about the engagement disk axle 36. The pair of calipers 70 can have a caliper 72 disposed on opposite sides of the clutch engagement disk 32 so that the clutch engagement disk 32 is positioned between the calipers 72 in the pair of calipers 70.

The pair of calipers 70 can engage the clutch engagement disk 32 by friction contact with the engagement surface 34. The pair of calipers 70 can be movable between a closed position with a shorter distance between each of the calipers 72, and an open position with a greater distance between each of the calipers 72. In the closed position the pair of calipers can contact and grasp the clutch engagement disk 32. The pair of calipers 70 and the clutch engagement disk 32 together can form the wheelchair clutch, indicated generally at 30.

In use, the pair of calipers 70 can be moved to the closed position so that a frictionally engageable surface 74 of the pair of calipers 70 can contact and engage the frictionally engageable surface 34 of the clutch engagement disk 32. In this way, the pair of calipers 70 can grasp and rotate the clutch engagement disk 32 as the lever arm 60 is moved forward and backward by the wheelchair occupant. Similarly, the pair of calipers 70 can close about a rotating clutch engagement disk 32 to apply friction to the engagement disk 32 in order to slow the engagement disk 32 and, hence, dynamically brake the wheelchair.

Figure 5:
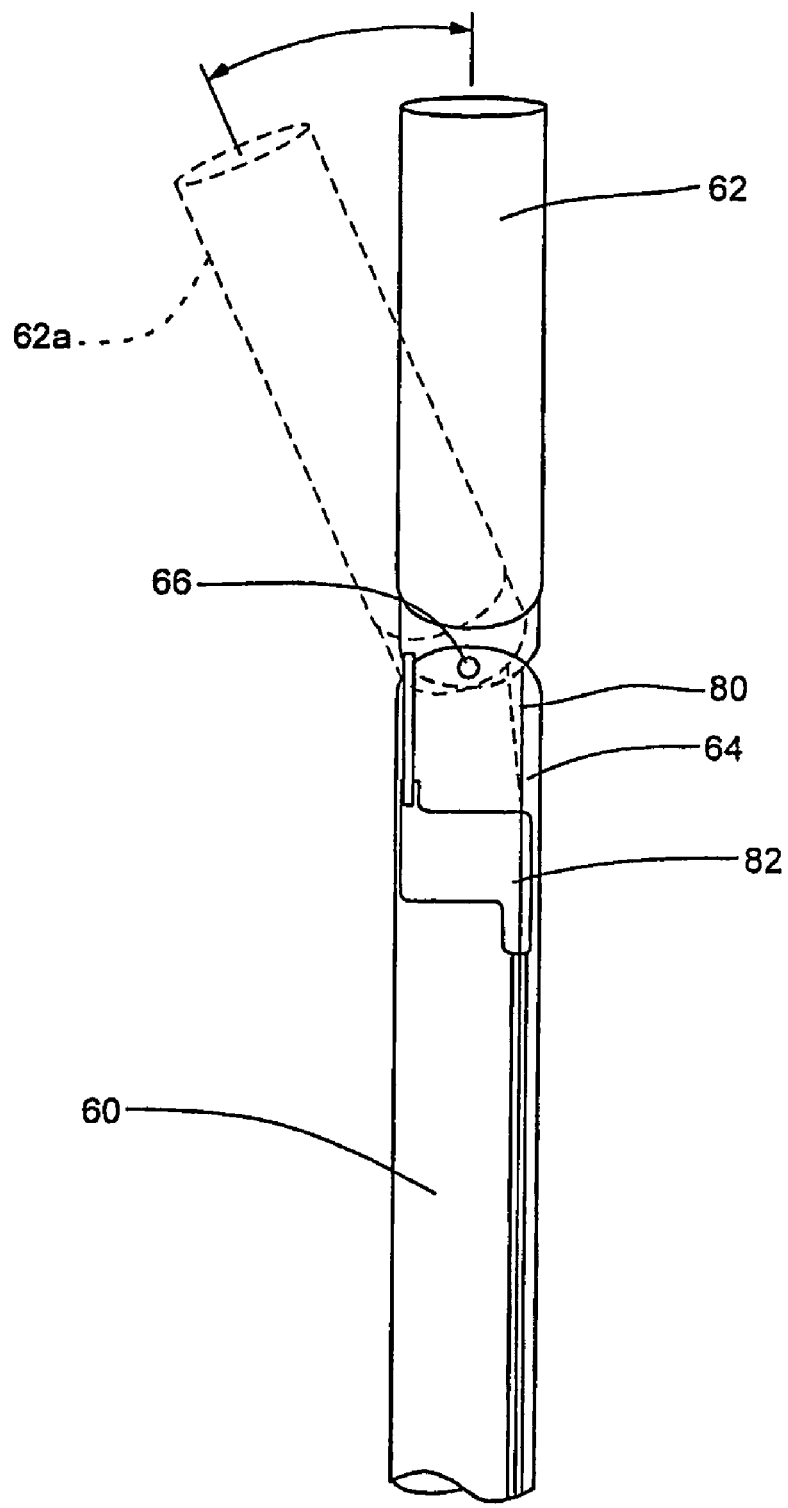
FIG. 5 is a partial front view of a propulsion lever arm of the wheelchair propulsion and braking system of FIG. 2.

Referring to FIG. 5, the lever arm 60 can also include a handle 62. The handle 62 can be operatively coupled to an upper end 64 of the lever arm 60. The handle 62 can be positioned and oriented in an accessible position to an occupant of the wheelchair 12 during use, as shown in FIGS. 1 and 2. As shown in FIG. 1, the handle 62 can also include an ergonomic arm rest 65. The arm rest 65 can include a bracket 67 that can support an arm of a wheelchair occupant. In an additional aspect, the handles 62 can include a spring or other mechanism which bias the lever handles to a non-engaged position when released by the user in order to prevent sticking or unintended braking.

Returning to FIG. 5, the handle 62 can be pivotally hinged to the upper end 64 of the lever arm 60. The handle 62 can pivot between a straight position in line with the lever arm and a tilted or pivoted position at an angle with the lever arm 60, as shown by dashed lines at 62a. The lever arm 60 can also include an actuator 80. The actuator 80 can be operatively coupled to the handle 62. The actuator 80 can actuate the pair of calipers 70 to engage the clutch engagement disk. In one aspect, the handles 62 can have a pivotal joint 66 coupling the handle 62 to the lever arm 60, and the actuator 80 can include a cable 82 extending from the handle 62 to the pair of calipers 70. Thus, as the handle 62 is pivoted about the pivotal joint, the cable 82 can be pulled to close the pair of calipers 70. Other actuators, as known in the art, can also be used to close the pair of calipers. As non-limiting examples, the actuator can be a hydraulic piston, an electric switch, or the like.

Referring again to FIG. 1, it is a particular advantage of the present invention that the handle 62 can be made to pivot perpendicular to the arm of the wheelchair occupant. In this way, the occupant simply needs to rotate his arm to pivot the handle and engage the wheelchair propulsion and brake device 10. It will be appreciated that rotating the arm, as opposed to the wrist, allows the user to apply more force to the handle 62 without subjecting the wrist to uncomfortable and possibly injurious angles, as required by turning the wheel ring 22 under conventional wheelchair propulsion.

It is another particular advantage of the propulsion and braking system 10 of the present invention that the handle 62 and pair of calipers 70 can be used to dynamically brake the wheels 20 to slow the momentum of the wheelchair 12. The pivoting action of the handle 62 can allow the user to apply a variable force to the clutch 30 in order to slowly or quickly decelerate and stop a moving wheelchair. In this way, the clutch 30 can act as an integrated fully proportional brake system as well as a clutch used to propel the wheelchair. Further, alternative configurations for engagement handles can be developed. For example, the handles can be adjusted to allow for engagement when pushing the handles forward. This can be accomplished by rotating the axes of rotation for each handle outward. Specifically, the axis of rotation for handles 62 can be viewed as an axis which runs substantially parallel to the floor and is perpendicular to the axle 36. A rotation of the axes of rotation for the handles outwardly by from about 20° to about 50° results in the engagement position being reached when the handles are pushed forward. Other similar modifications can be made to achieve improved performance and operating characteristics for various environments or preferences.

Figure 6:
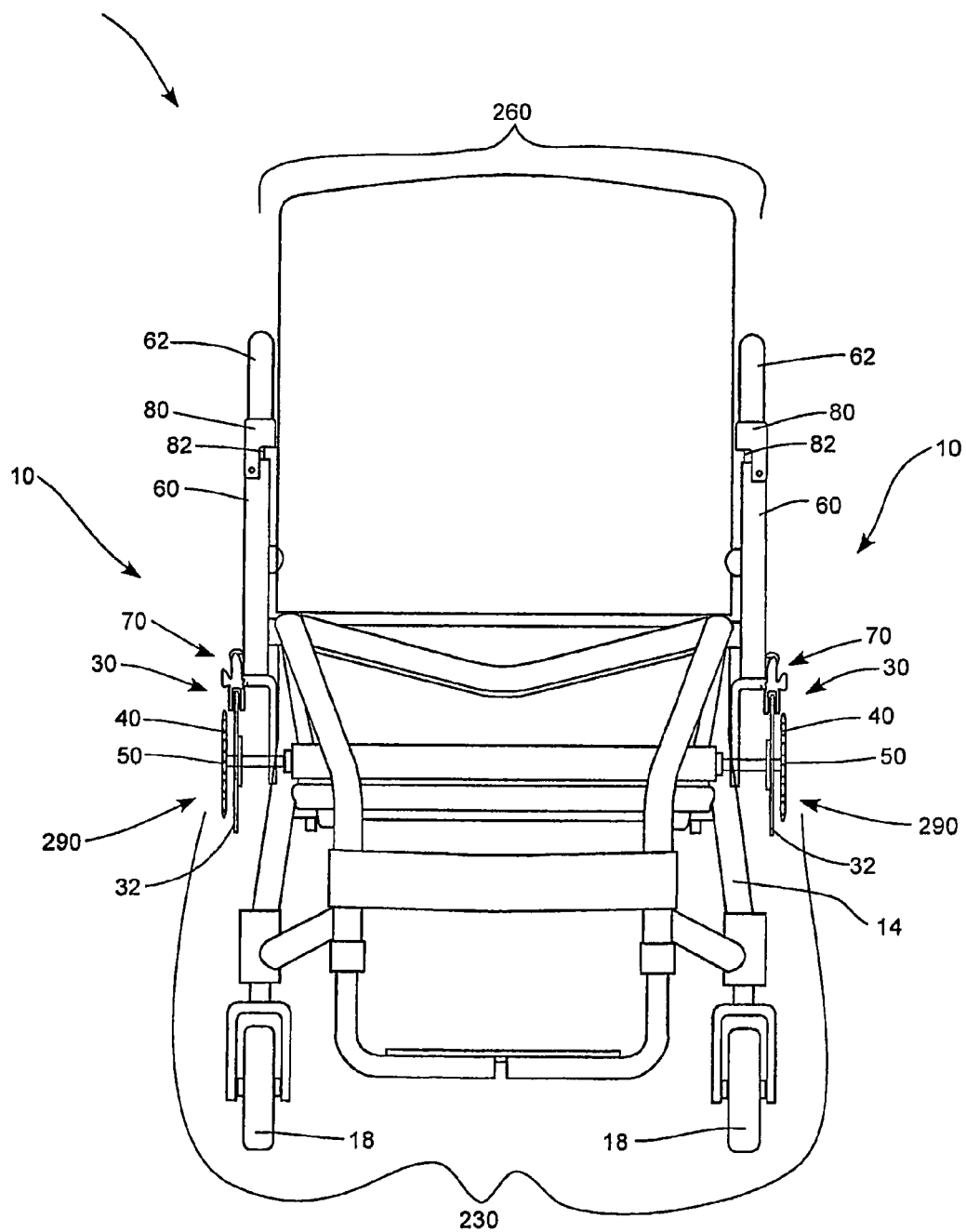
FIG. 6 is a front view of a wheelchair with a propulsion system, a drive train system and a disk brake system in accordance with an embodiment of the present invention.

Illustrated in FIG. 6, a wheelchair, indicated generally at 200, is shown in accordance with an embodiment of the present invention. The wheelchair 200 can include a pair of propulsion and braking systems 10 as described above, located on either side of the wheelchair 200. Thus, the wheel chair 200 can include a lever propulsion system, indicated generally at 260, a drive train system, indicated generally at 290, and a disk brake system, indicated generally at 230.

The lever propulsion system 260 can include a pair of lever arms 60 located on either side of the wheelchair 12. The lever propulsion system 260 can also include handles 62 jointedly connected to a pair of lever arms 60. The handles 62 can include actuators 80 operatively connected between the handles 62 and the disk brake system 230. For example, the actuator 80 can be a wire 82 coupled between the handle 62 and the disk brake system 230. The wire 82 can actuate the disk brake system 230.

Each lever arm 60 can also be operatively connected to a drive chain 40 of the drive train system 290. The drive chains 40 can be connected to at least one set of wheels mounted on a chair frame 14. In one aspect, the drive chains 40 can be coupled to the front wheels 18. In another aspect, the drive chains 40 can be coupled to the rear wheels (not shown).

The disk brake system 230 can include a pair of clutches 30 located on either side of the wheelchair 12. Each disk brake system 230 can be operatively connected to the lever propulsion system 260 and the drive train system 290 such that actuation of the disk brake system 230 is provided by the lever propulsion system 260 to rotate the at least one set of wheels.

Thus, in use, squeezing the handles 62 together pulls the cable 82 to actuate the pair of calipers 70 mounted near the bottom of the lever arm 60. The pair of calipers 70, when actuated, closes about the clutch engagement disk. The pair of calipers 70 and the clutch engagement disk 32 acts as a clutch 30 for all motion and braking between the lever arms 60 and wheels. The lever arm 60 can rotate independently of the clutch 30 and drive train until the clutch 30 is actuated. Once the pair of calipers 70 grabs the clutch engagement disk 32, the lever arm's rotation is coupled to that of the clutch engagement disk 32. To move the wheelchair 12 in either direction the user need only perform the squeezing motion on the handles 62 while pushing or pulling the lever arms 60 to make the wheelchair 12 move forward or backward, respectively. This makes switching directions or coasting in the wheelchair 200 very simple and logical.

The present invention also provides for a kit for retrofitting a wheelchair with a propulsion and braking system 10 in accordance with the present invention. The kit can include a lever propulsion system 260 including a pair of lever arms 60. Each lever arm 60 can have an actuator 80 operatively connected to the lever arm 60. Each actuator 80 can include a handle 62 jointedly coupled to the lever arm 60.

The kit can also include a drive train system 290. The drive train system 290 can include a pair of drive chains 40 and a pair of drive wheels 50. The kit can also include a disk brake system 230. The disk brake system can include a pair of disk brakes 32.

As described above, it is a particular advantage of the propulsion and braking system 10, as shown in FIGS. 1-5, and the wheelchair 200, as shown in FIG. 6, that the pair of calipers 70 of the clutch 30 can be used to dynamically brake the wheels to slow the momentum of the wheelchair 12. Thus, when a wheelchair has a pair of propulsion and braking systems 10 located on either side of the wheelchair 12, as shown in FIG. 6, a wheelchair occupant can use both of the lever arms 60 to dynamically brake and slow a moving wheelchair, or to turn a wheelchair by dynamically braking one wheel. For example, when a user desires to slow down, turn, or stop their wheelchair all the user must do is squeeze the lever arm handles 62 towards each other with a force proportional to the braking power they desire and resist the induced lever rotation. This squeezing motion is just like that required to propel the wheelchair, as described above, with the difference for braking purposes being that the user now resists the rear wheels' 20 energy rather than adding to it. By applying different amounts of squeezing force the user will be able to turn the wheelchair or otherwise control their movements with the same or better precision than they have with standard wheelchairs while pushing against the wheel ring 22 to slow or brake.

The present invention provides other advantages that make propelling or braking a wheelchair 200 easier and less damaging to a wheelchair user's body. For example, forward and reverse can be accomplished in much the same way as is done with a wheelchair hand ring 22, except the user can push and pull on the at least one lever arm 60 instead. Thus, for each push or pull motion the user can rotate or pivot the handle 62 of the lever inward (perpendicular to the user's arm or forward motion of the chair) to actuate the clutch 30 that couples the lever arm 60 and rotation of the rear wheel 20.

Furthermore, the present invention requires no switches or buttons to push in order to travel in reverse. Instead, the user simply presses inward on the handles to actuate the clutch 30, and pulls the at least one lever arm 60 backward instead of forward. When the handle 60 is not being pivoted inward and the clutch is consequently disengaged the rear wheel 22 is allowed to spin freely, just as when a wheelchair user applies no friction to the hand ring 22 on a regular wheelchair. The brakes are applied with the same clutch-engaging movement but with less force, thus allowing the clutch 30 to slip and slowing the rear wheel 22 rather than stopping the rear wheel 22 and the wheelchair 12 abruptly.

Additionally, rather than requiring the user to create friction on the hand ring 22 by pressing against the hand ring with the user's hand, while also applying a tangential force to rotate the wheel, the user simply needs to squeeze the handles 62 toward each other lightly. This allows the user to concentrate most of their force on the lever arms 60 to rotate the rear wheels 20.

Additionally, it will be appreciated that the force required to push a wheelchair varies due to changes in the terrain or incline. Consequently, some users have the strength to travel across most terrains and inclines, while others may find it difficult to go up ramps that are specifically provided for wheelchairs. The present invention provides a mechanical advantage with the combination of the lever length and a set ratio provided by the gear and drive wheel. This ratio can be customized for each specific chair depending on the requirements of the user. A stronger user may desire a 1:1 ratio or even higher to allow for higher speeds while someone with less strength could request a lower ratio to increase their effective strength. Additionally, multiple gearing devices, as known in the art, can also be implemented on the present invention to include multiple gear ratios that can be dynamically switched by the user. For example, the handle 62 can include a grip shifter which allows shifting the drive chain between various sized gears on the drive gear and drive wheel. Such a mechanism can include a derailer and concentric gear system such as those commonly found in bicycles.

Another advantage of the propulsion and braking device 10 of the present invention is that the levers provide an improved path for the user's hand when propelling a wheelchair 12. It will be appreciated that the posture of a wheelchair user while pushing on hand rings 22 can cause deviations in the wrists with high force which can cause unacceptably high stresses in the tendons and result in injuries. The lever arms 60 of the present invention can reduce this problem by locating the lever arms' axis of rotation in front of the axle of the rear wheels 22, thereby providing a propelling motion similar to bench pressing straight out from the user's chest. In one aspect the lever arms' axis of rotation can be approximately 14 inches in front of the axle of the rear wheels 22. This bench pressing motion uses the strongest muscles in the chest and arms, unlike the downward arc followed when pushing on a wheel ring 22.

It will be appreciated that apart from the mechanical advantages of the levers and gears, the lever arms 60 also promote use of stronger muscle groups which improves the mobility of the wheelchair user. As mentioned earlier, the path that the lever handle 62 follows allows the user to use those that are used when doing a bench press while weight lifting, which is the strongest motion the human body can provide with the arms and hands. The pectorals and triceps that are used to move the lever arms are typically a much stronger group of muscles than the muscles used to push the wheel rings 22 on a conventional unmodified wheelchair, which are mainly the upper shoulder muscles (deltoids). By using a stronger muscle group the user should be able to create greater pushing force and be able to travel with more ease than by using the wheel rings 22. The user should also be able to push for a greater length of time without becoming fatigued as quickly as when using a standard wheelchair.

Another significant benefit of the present invention is a dramatic reduction in the complicating effects of traveling through snow. The wetting and cooling affects of snow on the rear wheel 20 and wheel ring 22 not only create an uncomfortable experience for the wheelchair user, but also reduce the amount of friction that can be applied to the wheel ring 22 propel the wheelchair 12. Further, when traversing mud, snow, or other debris such materials can become attached to the wheels which then contribute to soiling of the user's hands. With the point of contact of the user's hands being moved to the lever arm 60, a point that never goes near the ground, these problems are eliminated.

Another advantage is that the present invention accounts for human factors in learning to drive a manual wheelchair. Hence, the same core movements that move a traditional wheelchair will produce the same results in a wheelchair equipped with the propulsion and braking device of the present invention, thereby making it easy for wheelchair users to adapt to operating the devices of the present invention.

Returning to FIG. 2, the propulsion and braking system 10 of the present invention can also provide a locking function to hold the wheelchair 12 stationary when needed. This function can replace the current wheel locking mechanism found on wheelchairs, which in many cases does not provide sufficient holding force to keep a wheelchair stationary.

To use the propulsion and braking device 10 as a parking brake, the lever arms 60 can be locked in a predetermined set position with a clip 92 that can be mounted to the wheelchair frame 14. The actuator 80 can then be locked to the engaged position to clamp the pair of calipers 70 about the clutch engagement disk 32. With the pair of calipers 70 locked into the engaged position and the lever arms 60 locked to the predetermined set position, the clutch 30 and drive train 90 cannot move and the wheels of the wheelchair 12 cannot freely rotate. In one aspect, a spring-lock can secure the handle 62 to the pivoted engaged position.

In another aspect, as illustrated in FIG. 2, a small parking brake handle 94 can be mounted on the wheelchair 12 and, with the lever arm 60 in the predetermined locked position the parking brake handle 94 can be pushed forward to make a rod, shown as dashed lines at 96, protrude into the lever arm 60, thereby pushing against the cable 82 to deflect the cable 82 and actuate the pair of calipers 70. The farther the parking brake handle 94 is pushed, the more the cable 82 will be deflected, thereby creating a greater holding force.

A locking mechanism can be used to secure parking brake handle 94. For example, once the desired tension against the cable 82 is obtained the user can push in toward a locking tooth mechanism (not shown). Once in that position the cable 82 will keep pressure against the parking brake handle to keep the handle in the locked position. To unlock the park brake handle 94, the user simply pushes the park brake handle forward to release locking mechanism and allow the park brake handle 94 to fully return to the unlocked position. Alternatively, a clip or other mechanism can be used to retain the handles 62 in the engaged position.

While the lever arm 60 is in the locked position the park brake handle 94 may also be used as a dynamic brake by actuating the park brake handle 94 in the same manner described above without pushing the park brake handle 94 into the locking mechanism. This could allow the user to brake while coasting down a hill or other situations without having to take the lever arms 60 out of the locked position.

If the user is in a situation that the lever arms 60 are not needed, the lever arms 60 can be left in the locked position without having them interfere with the normal use of the wheelchair 12. Thus, the dynamic braking system of the present invention allows the wheelchair user to dynamically brake while using the lever arms 60, thereby giving the user simple braking transition in forward and reverse. The user can also move the lever arms 60 out of the way and lock them in a predetermined position which allows the user to brake while coasting in a way that does not require the user to resist the torque that is generated on the lever arms by the regular dynamic braking method.

The present invention also provides for a method for propelling and braking a wheelchair including grasping ergonomically positioned handles on lever arms on either side of a wheelchair. The handles can be pivoted toward each other in order to close a pair of calipers about a disk brake. The lever arms can be pulled toward the rear of the wheelchair to rotate the disk brake and a drive chain operatively coupled between the disk break and a rear wheel of the wheelchair in order to turn the wheel and propel the wheelchair. The handles can be returned to an unpivoted position in order to allow the chair to coast. The handles can be pivoted when the chair is coasting to cause the pair of calipers to engage the disk brake and resist motion of the disk brake, thereby slowing the rotation of the disk brake and the wheelchair.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A wheelchair propulsion and braking system, comprising:
   a) at least one clutch engagement disk rotatably couplable to a wheelchair frame, and including:
      i) a gear rotatable with the clutch engagement disk; and
      ii) a drive chain disposed around the gear;
   b) a drive wheel rotatably attachable to a wheel of the wheelchair, and operatively attachable to the drive chain; and
   c) at least one lever arm rotatably couplable to the wheelchair frame, and including:
      i) a handle jointedly connected to an upper end of the lever arm, and oriented in an accessible position during use;
      ii) a pair of calipers operatively coupled to the at least one lever arm and engageable with the at least one clutch engagement disk; and
      iii) an actuator operatively coupled to the handle to actuate the calipers and engage the clutch engagement disk when the handle pivots about the jointed connection.

2. The system of claim 1, wherein the clutch engagement disk further includes a disk brake.

3. The system of claim 1, wherein the at least one clutch engagement disk and the at least one lever arm further includes two clutch engagement disks with each of the clutch engagement disks operatively coupled to one lever arm.

4. The system of claim 3, wherein the lever arms are positioned on opposite sides of the wheelchair frame.

5. The system of claim 1, wherein the clutch engagement disk further includes an engagement surface engageable by the pair of calipers to rotate the engagement disk.

6. The system of claim 1, wherein the pair of calipers are coupled near a lower end of lever arm.

7. The system of claim 1, further including a clutch axle coupled to the clutch engagement disk and rotatable therewith, and the clutch axle being rotatably coupled to the wheelchair frame.

8. The system of claim 1, wherein the actuator includes a cable operatively coupled to the handle and operable to close the pair of calipers about the engagement disk when the handle is pivoted to the engaged position.

9. The system of claim 1, wherein the at least one lever arm further includes an ergonomic arm rest.

10. The system of claim 1, wherein the at least one lever arm further includes a parking brake including an actuator lock configured to lock the actuator into the engaged position to retain the calipers on the clutch engagement disk and prevent motion of the clutch engagement disk independent of the at least one lever arm.

11. The system of claim 1, wherein a lower distal end of the at least one lever arm includes a fork sized and shaped to fit over the gear without contacting the gear.

12. A wheelchair, comprising:
   a) a lever propulsion system operatively connected to a drive train system, said drive train system being connected to at least one set of wheels mounted on a wheelchair frame; and
   b) a disk brake system operatively connected to the lever propulsion system and the drive train system such that actuation of the disk brake system is provided by the lever propulsion system to rotate the at least one set of wheels, said lever propulsion system having a handle jointedly connected to a lever arm, said lever arm being operatively connected to the drive train system and the handle being configured to actuate the disk brake system by pivoting about the jointed connection.

13. The wheelchair of claim 12, further comprising a cable operatively connected between the handle and the disk brake system, said cable being configured to actuate the disk brake system.

14. The wheelchair of claim 12, further comprising:
   a) a caliper operatively coupled to the lever arm and engageable with the disk brake system; and
   b) an actuator operatively coupled to the handle to actuate the caliper and engage disk brake system.

15. The wheelchair of claim 12, wherein the drive train system further includes a drive wheel fixedly coupled to, and coaxial with, a wheel of the wheelchair and the disk brake system includes a clutch engagement disk rotatably coupled to the wheelchair frame, the clutch engagement disk being fixedly coupled to a gear, the drive wheel being coupled to the gear by a drive chain such that rotation of the wheel of the wheelchair causes rotation of the clutch engagement disk.

16. The wheelchair of claim 12, wherein the disk brake system includes a clutch engagement disk rotatably couplable to the wheelchair frame, the clutch engagement disk further comprising:

a) a gear rotatable with the clutch engagement disk; and
b) a drive chain disposed around the gear.

17. A retrofit kit for modifying a wheelchair, comprising:
a) a lever propulsion system including a pair of lever arms, each lever arm jointedly connected to a handle having an actuator operatively connected thereto;
b) a drive train system including a pair of drive chains and a pair of drive wheels; and
c) a disk brake system including a pair of disk brakes, the handles being configured to actuate the disk brakes by pivoting about the jointed connections.

18. The system of claim 1, wherein the handle pivots about an axis of rotation that is substantially parallel to a ground surface and that is perpendicular to an axis of the rotatable coupling of the at least one lever arm and the wheelchair frame.

* * * * *

UNITED STATES PATENT AND TRADEMARK OFFICE
CERTIFICATE OF CORRECTION

| | | |
|---|---|---|
| PATENT NO. | : 8,087,684 B2 | |
| APPLICATION NO. | : 11/919467 | |
| DATED | : January 3, 2012 | |
| INVENTOR(S) | : Donald S. Bloswick et al. | |

It is certified that error appears in the above-identified patent and that said Letters Patent is hereby corrected as shown below:

Title page, item (86) PCT No., delete "PCT/US2006/316068" and insert --PCT/US2006/16068--

Signed and Sealed this
Eighth Day of May, 2012

David J. Kappos
*Director of the United States Patent and Trademark Office*